(12) United States Patent
Bolind et al.

(10) Patent No.: US 7,175,426 B2
(45) Date of Patent: Feb. 13, 2007

(54) HIGH EFFICIENCY REFRACTORYLESS KETTLE

(75) Inventors: Michael L. Bolind, Ingleside, IL (US); Warner J. Dundas, Des Plaines, IL (US); Michael J. Porter, Akron, IN (US); Christopher R. Nelson, Grayslake, IL (US); Subhash Deodhar, Vernon Hills, IL (US)

(73) Assignee: United States Gypsum Company, Chicago, IL (US)

( * ) Notice: Subject to any disclaimer, the term of this patent is extended or adjusted under 35 U.S.C. 154(b) by 371 days.

(21) Appl. No.: 10/788,871

(22) Filed: Feb. 27, 2004

(65) Prior Publication Data

US 2005/0188897 A1    Sep. 1, 2005

(51) Int. Cl.
*F27B 15/02* (2006.01)
(52) U.S. Cl. ................... 432/16; 106/722; 106/772
(58) Field of Classification Search ............ 432/15, 432/16, 61, 58, 209; 106/722, 744, 772, 106/783; 110/245; 423/554
See application file for complete search history.

(56) References Cited

U.S. PATENT DOCUMENTS

| | | | |
|---|---|---|---|
| 2,261,872 A | 11/1941 | Choate | |
| 3,236,509 A | 2/1966 | Blair | |
| 3,307,840 A | 3/1967 | Conroy, Jr. | |
| 3,307,915 A | 3/1967 | Conroy et al. | |
| 3,378,246 A | 4/1968 | Leding | |
| 3,576,599 A | 4/1971 | Anderson et al. | |
| 3,669,435 A | 6/1972 | Silverberg | |
| 3,871,829 A | 3/1975 | Keith et al. | |
| 3,901,645 A | 8/1975 | Rowland | |
| 4,113,836 A | 9/1978 | O'Connor | |
| 4,117,070 A | 9/1978 | O'Neill | |

(Continued)

FOREIGN PATENT DOCUMENTS

DE    169737 A1    4/1906

(Continued)

OTHER PUBLICATIONS

Page from Babcock-BSH catalog showing rotary drum calciners with coolers. Germay. Such rotary calciners were first used in 1925.

(Continued)

*Primary Examiner*—Gregory Wilson
(74) *Attorney, Agent, or Firm*—Marshall, Gerstein & Borun, LLP; Michael M. Geoffrey; David F. Janci

(57) ABSTRACT

An apparatus for calcining gypsum including a housing having a bottom wall, open top, and a plurality of side walls extending therebetween. A fixture is located adjacent the open top for receiving gypsum from a source and transferring the gypsum into the housing. At least one burner is connected to the housing and operable for combusting an air-fuel mixture to heat the gypsum. At least one serpentine burner conduit extends from the burner through the housing and terminates through a support floor of the apparatus. The exhaust flow is then directed through a fluidization pad and into the gypsum to further heat the gypsum product. An agitation mechanism is operable to mix the gypsum adjacent the fluidization pad to prevent pockets of gypsum from coagulating and preventing fluidization of the gypsum.

69 Claims, 6 Drawing Sheets

U.S. PATENT DOCUMENTS

| | | |
|---|---|---|
| 4,161,390 A | 7/1979 | Page et al. |
| 4,176,157 A | 11/1979 | George et al. |
| 4,188,186 A | 2/1980 | Ladwig |
| 4,215,981 A | 8/1980 | von Dreusche, Jr. |
| 4,227,873 A | 10/1980 | Manshausen et al. |
| 4,238,238 A | 12/1980 | Kinkade et al. |
| 4,522,587 A | 6/1985 | Miller |
| 4,576,573 A | 3/1986 | Ruehenbeck |
| 4,626,199 A | 12/1986 | Bounini |
| 4,629,419 A | 12/1986 | Ward et al. |
| 4,744,961 A | 5/1988 | Bounini |
| 4,744,963 A | 5/1988 | Dozsa et al. |
| 4,915,623 A | 4/1990 | Ball et al. |
| 5,007,825 A | 4/1991 | Williams |
| 5,011,668 A | 4/1991 | Ball et al. |
| 5,139,749 A | 8/1992 | White |
| 5,333,597 A * | 8/1994 | Kirkpatrick et al. .... 126/110 R |
| 5,743,728 A | 4/1998 | Cloud et al. |
| 5,743,954 A | 4/1998 | Rowland et al. |
| 5,927,968 A | 7/1999 | Rowland et al. |
| 5,954,497 A | 9/1999 | Cloud et al. |

FOREIGN PATENT DOCUMENTS

| | | |
|---|---|---|
| DE | 1558080 A1 | 1/1970 |
| GB | 1018464 A1 | 1/1966 |
| GB | 1087549 A1 | 10/1967 |
| GB | 1198807 A1 | 7/1970 |
| GB | 1488665 A1 | 10/1977 |
| GB | 2043219 A1 | 10/1980 |

OTHER PUBLICATIONS

Page from Krupp Polysius catalog showing POLCAL calcining system. Netherlands. One such calcining system was in use starting in 1993.

British Gypsum Limited, "High Efficiency Calcining of Gypsum", 1998, pp. 1-8.

* cited by examiner

HIGH EFFICIENCY REFRACTORYLESS KETTLE

The present invention relates to a high efficiency method and apparatus for calcining gypsum and/or drying gypsum.

BACKGROUND OF THE INVENTION

Calcining of gypsum comprises converting calcium sulfate dihydrate by heating it into calcium sulfate hemihydrate, better known as stucco. Prior calcining apparatus and methods have taken various forms. Traditionally, the calcining of gypsum has occurred in a large kettle, having a thickened dome-shaped bottom, against which a gas-fired flame is directed, with the kettle and burner flame being enclosed in a suitable refractory structure. There is usually an associated hot pit into which the calcined material is fed. The kettle must withstand temperatures in the 2,000°–2,400° F. range, hence requiring expensive fire box steel plate on its domed bottom, which was typically 1¾ inches thick. U.S. Pat. No. 3,236,509 typifies this type construction. This approach had numerous disadvantages, such as the extreme waste of hot burner gases, and the associated refractory brick enclosure which, when repairs or kettle shut-down were needed, first required a lengthy cool-down period.

Other calcining kettles, of the general type described above, have included supplemental submerged combustion designs where exhaust gases from the gas-fired burners were discharged directly into the kettle contents. Here, the gas flame directly impinged against the material being calcined, and there was an increased possibility of creating so-called "dead burn" material, i.e., insoluble anhydrite. U.S. Pat. Nos. 4,176,157 and 4,238,238 typify that type approach. Additionally, other prior art calcining kettles, of the general type described above, included a series of cross burner tubes which passed generally horizontally completely through the kettle, allowing the hot gases within the refractory structure and surrounding the kettle to be supplementally directed through the tubes, and thus, through the kettle contents to further heat the same. U.S. Pat. Nos. 3,307,915 and 4,163,390 typify this type kettle construction. There have also been horizontally-aligned, rotary calcining structures; U.S. Pat. No. 3,871,829 typifies this type approach.

Besides the above kettle constructions which normally require expensive refractory structure, there have also been refractoryless kettles using the submerged combustion principle, including those having auxiliary draft tube structure encompassing the main burner tube, so as to reduce formation of dead-burned insoluble anhydrite. U.S. Pat. No. 4,626,199 typifies this type construction. Additionally, there are so-called refractoryless conical kettles with various types of submerged combustion heating systems, again with the attendant risk of creating non-uniform stucco and dead burn material. U.S. Pat. Nos. 4,629,419 and 4,744,961 typify such conical kettle constructions. More recent calcining kettle modifications have included so-called "boost" burner constructions, including electrical boost calrods, see U.S. Pat. No. 4,744,963, and gas-fired boost burner designs, both added as supplemental heaters to traditional refractory-type kettle constructions.

U.S. Pat. Nos. 5,743,954 and 5,927,968 disclose a method and apparatus for the continuous calcining of gypsum material in a refractoryless kettle preferably heated by a multiple series of separate immersion tube coils, each coil operating within a specific calcining zone inside the kettle.

SUMMARY OF THE INVENTION

The present invention provides for an apparatus for calcining gypsum having a housing with a bottom wall, an open top, and a plurality of side walls extending between the bottom wall and the open top. A fixture is attached to the housing for receiving raw gypsum from a source and transferring the gypsum into the housing. The apparatus further includes at least one burner connected to the housing and operable for combusting an air-fuel mixture to heat the gypsum. At least one serpentine burner conduit extends from the burner through the housing and terminates through an upper surface of a support floor operable for holding the gypsum in the housing. The gypsum is first heated through conduction heat transfer from the burner conduit and is further heated by the exhaust gas that re-enters the gypsum from the bottom of the apparatus. The exhaust gas fluidizes the gypsum as part of the calcining process.

The apparatus may include an agitation mechanism operable for ensuring good fluidization of the powdered gypsum. The apparatus is operable for preventing channeling of exhaust gas through the gypsum, preventing dead zones in the gypsum, and for preventing the gypsum from collecting along the surface of the gypsum support floor. The agitation mechanism includes an agitator frame and a plurality of agitation members connected thereto. The agitation mechanism is operable for agitating the gypsum adjacent the support floor when the agitator frame is reciprocally moved from a first position to a second position. The agitator frame has at least one pivotal support arm that is pivotally attached to the calcining apparatus on one end and to the frame at the other end such that the frame will swing about a pivot axis when the motion is imparted to the frame. An actuator arm extends through the side of the housing to provide a mechanical connection between an actuator and the agitator frame.

A method for calcining gypsum includes providing gypsum to a calcining apparatus. The gypsum is first heated via conduction with a serpentine burner conduit extending from an external burner through the gypsum and terminating through a surface of the gypsum support floor. The exhaust gas is directed through a fluidization pad to fluidize and further heat the gypsum via convection as the exhaust gas flows through the gypsum and out the top of the apparatus.

Other applications of the present invention will become apparent to those skilled in the art when the following description of the best mode contemplated for practicing the invention is read in conjunction with the accompanying drawings.

DETAILED DESCRIPTION OF THE INVENTION

Figure 1:
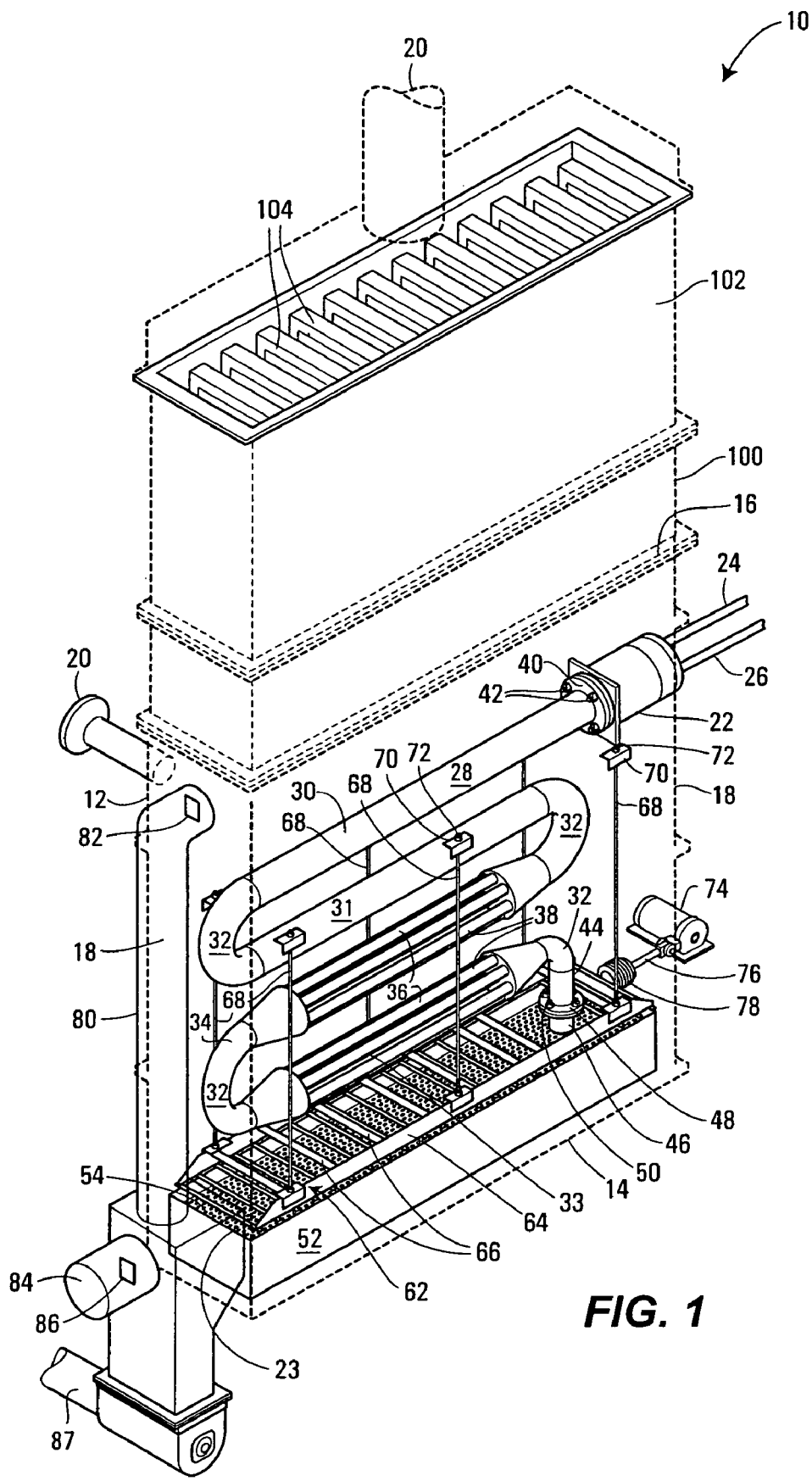
FIG. 1 is a perspective view of a high-efficiency calcining apparatus.
Figure 2:
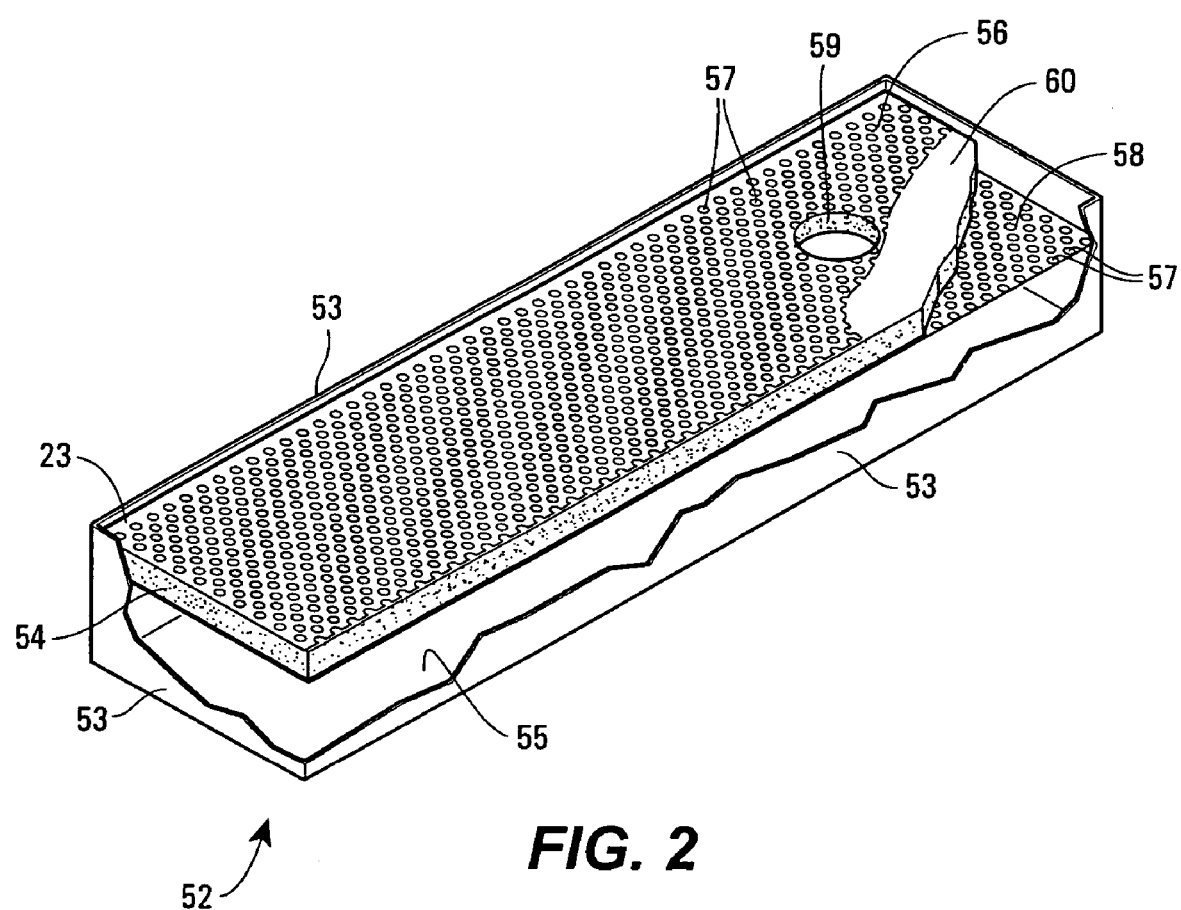
FIG. 2 is an enlarged perspective view of a fluidization bed partially cut-away to show the layers of a fluidization pad.
Figure 3:
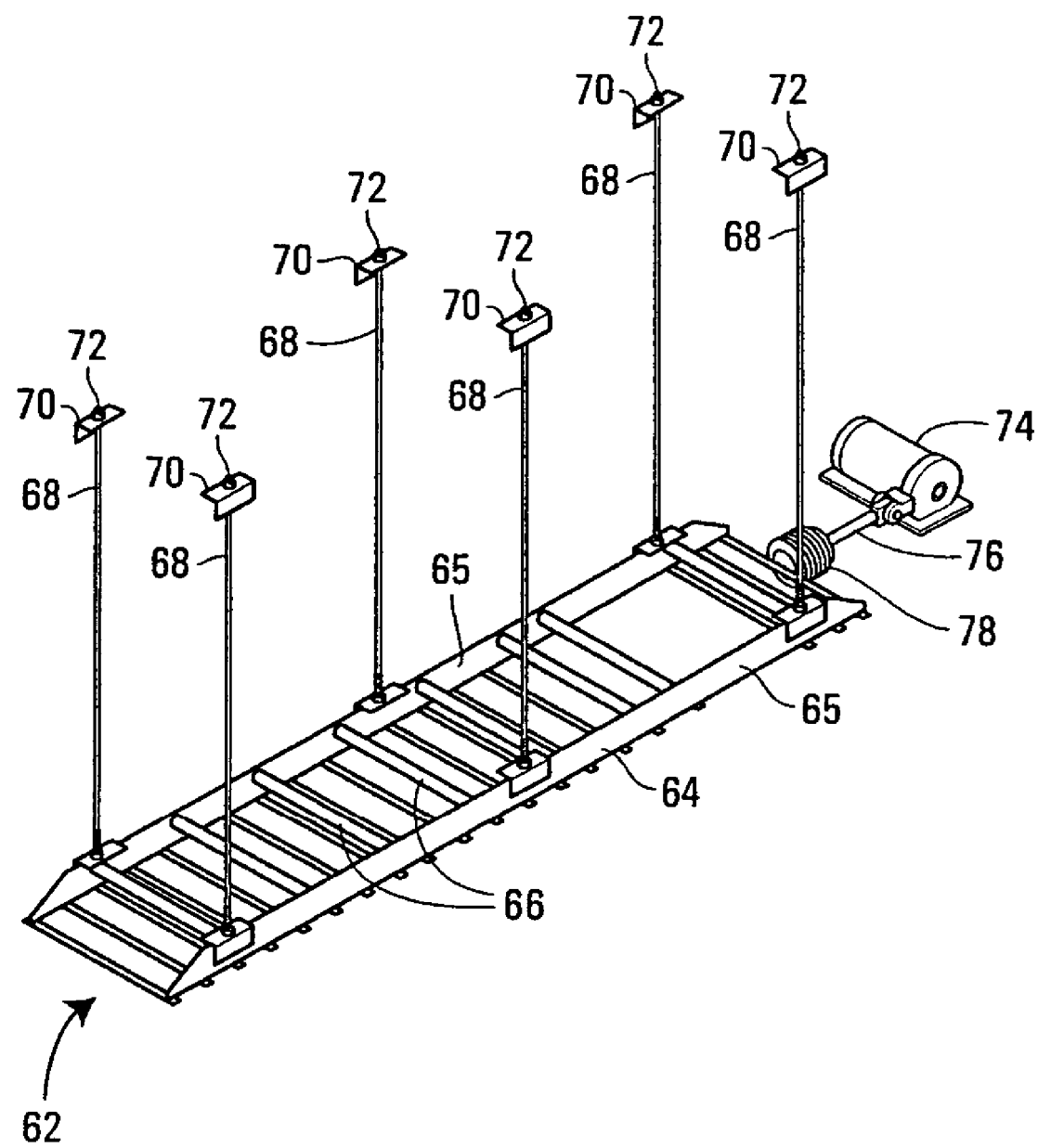
FIG. 3 is a perspective view of an agitation mechanism.

Referring to FIG. 1, an apparatus 10 for calcining gypsum is shown therein. A housing 12 includes a bottom wall 14, an open top 16, and a plurality of side walls 18 extending between the bottom wall 14 and the open top 16. An inlet fixture 20 is located on the housing 12 for receiving crushed or synthetic raw gypsum from a source (not shown) and for transferring the gypsum into the housing 12. At least one burner 22 is connected to the housing 12. The burner 22 is operable for combusting an air-fuel mixture supplied by a forced air conduit 24 and a fuel conduit 26. The burner 22 can be any type known to those skilled in the art, but will typically burn a hydrocarbon based fuel. The heated exhaust from the burner 22 will flow through at least one serpentine shaped burner conduit 28 that extends through a gypsum support floor 23 adjacent the bottom wall 14 of the housing 12. The hot exhaust flow from the burner 22 is utilized to heat the gypsum material to approximately 300° F. In known manner, the heating process converts the gypsum into calcium sulfate hemihydrate, or stucco. Alternatively, the heating process can simply heat wet synthetic gypsum to a desired temperature, typically below 300° F. in order to dry excess moisture from the wet synthetic gypsum for subsequent calcination in a separate process. Alternatively, the heating process can perform the drying and calcination processes in the same vessel.

The burner conduit 28 advantageously includes an elongate linear portion 30 extending away from the burner 22. The linear portion increases the life span of the burner conduit 28. That is, if the flames from the burner 22 were to directly impinge the burner conduit 28 along a curved or angled portion, the flames would overheat the side wall of the conduit causing high stress which shortens the life of the conduit 28. However, due to the presence of the initial elongated linear burner section 30 (which can extend some fifteen to twenty feet in a commercial installation), the burner flames do not directly impinge on the burner conduit, and this is because the flames have converted, along the length of section 30, to hot exhaust gases. Importantly, the burner conduit 28 includes a plurality of curved sections 32 to connect the linear portions 30, 31, and 33, provide the serpentine shape. The burner conduit 28 may include at least one reduced diameter section 34 to provide increased exhaust flow velocity to thereby enhance the heat transfer effectiveness of the conduit 28. The temperature of the exhaust cools proportionally to the distance it moves away from the burner 22, therefore the velocity may be increased to maintain a suitable heat transfer rate. The burner conduit 28 can also include a multi-conduit portion 36 wherein a plurality of relatively smaller diameter conduits 38 are formed to be in fluid communication with relatively larger single conduit portions 32. The smaller diameter conduits 38 provide more surface area for a given effective flow area and thus increase the heat transfer relative to the larger conduit 32. The multi-conduit portions 36 can be connected to the single conduit portions 32 through various means known to those skilled in the art such as welding, brazing, and press fit, mechanical fasteners, etc. The burner conduit 28 can be attached to the burner 22 via a flange 40 with a plurality of threaded fasteners 42. The burner conduit 28 likewise can be attached at the discharge end 44 to an outlet conduit 46 that extends through the support floor 23. The burner conduit 28 can be attached to the outlet conduit 46 via a flange 48 with a plurality of threaded fasteners 50.

A fluidization base 52, shown in FIGS. 1, 2, 4, and 6 (best seen in FIG. 2) can be positioned in a lower portion of the housing 12 to receive exhaust flow from the burner conduit 28. The fluidization base 52 has a plurality of sidewalls 53 extending upwardly from a bottom 55. The fluidization base 52 can have a fluidization pad 54 positioned above the bottom 55 of the fluidization base 52. The fluidization pad 54 forms at least a portion of the support floor 23 of the housing 12. The fluidization pad 54 is operable for containing the gypsum product along the lower portions of housing 12, and for evenly distributing the exhaust flow as it passes from the fluidization base 52 directly into the gypsum. The fluidization base 52 delivers the aeration, the agitation ensures good fluidization especially of cohesive powders that will not otherwise fluidize. The fluidization pad 54 includes first and second outer perforated plates 56, 58. The plates 56, 58 include a plurality of through apertures 57 that permit the exhaust flow to pass therethrough. A bore hole 59 is formed in the fluidization pad 54 to provide access for the conduit 46 (see FIG. 1) to pass through and deliver the exhaust flow to the fluidization base 52. At least one intermediate porous layer 60, formed of a porous fiber mat or woven stainless steel media, is positioned between the outer plates 56, 58. The intermediate layer 60 of media can be made from compressed silica fiber, woven stainless steel mesh or similar materials suitable for fluidization as known to those skilled in the art to withstand high exhaust gas temperatures. The perforated plates 56, 58 are most preferably made from a metal such as stainless steel or the like. The fluidization pad 54 operates by allowing diffused exhaust gas to bubble out through the generally evenly spaced apertures 57 of perforated plate 56. One advantage to using woven stainless steel media 60 is that the perforated plates 56, 58 are not required except to provide support and protection for the media from punctures.

An agitation mechanism 62, shown in FIGS. 1, 3, 4, and 6 (best seen in FIG. 3), can be positioned just above the fluidization pad 54. The agitation mechanism 62 includes an agitator frame 64 having a pair of side beams 65. The agitator frame 64 has a plurality of agitation members 66 connected to the agitator frame 64 for agitating the gypsum product adjacent the fluidization pad 54 along the support floor 23. In one embodiment, the agitation members 66 can take the form of a cross bar pattern. The agitation mechanism 62 locally churns the heated gypsum product when the agitator frame 64 is set into motion. At least one pivotal support arm 68 pivotally connects the agitation frame 64 to the housing 12 (shown in FIG. 1). The connection to the housing 12 can be formed with an angle plate 70 affixed to the housing 12 in a suitable manner such as by welding or mechanically fastening, etc. The support arm 68 can be secured to the angle plate 70 via a threaded fastener 72 or the like. The pivotal support arm 68 is most preferably a cable or similar structure to more easily facilitate a swinging motion by the agitator frame 64 about a common pivot axis when motion is imparted to the agitator frame 64. Alternate moving patterns by the agitator frame 64 are contemplated by the present invention. For example, one skilled in the art would readily understand how to impart motion to the agitator frame 64 in a vertical, horizontal, or arcute pattern, or any combination thereof.

An actuation power source, such as an electric motor or pneumatic air cylinder 74, can be connected to the agitator frame 64 through an actuator arm 76. An expandable seal 78 is engaged with the actuator arm 76 and the housing 12 (not shown in FIG. 2) to prevent gypsum product from leaking out of the housing 12 about the actuator arm. The seal 78 expands and contracts as the actuator arm 76 moves between first and second positions as the agitator frame 64 swings. Alternatively, the actuator arm 76 can be connected to mechanically leveraged linkages (not shown) that can extend from an actuation power source (not shown) positioned at the top of the housing 12 down to the agitator frame 64 as is known to those skilled in the art. The seal 78 can be made from any suitable material that can withstand temperatures greater than 300 degrees Fahrenheit and pressures up to 10 psig (pounds per square inch gage).

Referring again to FIG. 1, an overflow tube 80 is fluidically connected to the housing 12 to allow processed gypsum to egress from the housing 12 into the overflow tube 80. An overflow valve 82 is associated with the overflow tube 80 to prevent gypsum from egressing from the housing 12 prior to being heated to a predetermined condition. A dump port 84 includes a dump valve 86 that permits the selective draining of the contents in the housing 12. The valves 82, 86 can be of any type known to those skilled in the art, but are most preferably electrically or pneumatically actuated.

Figure 4:
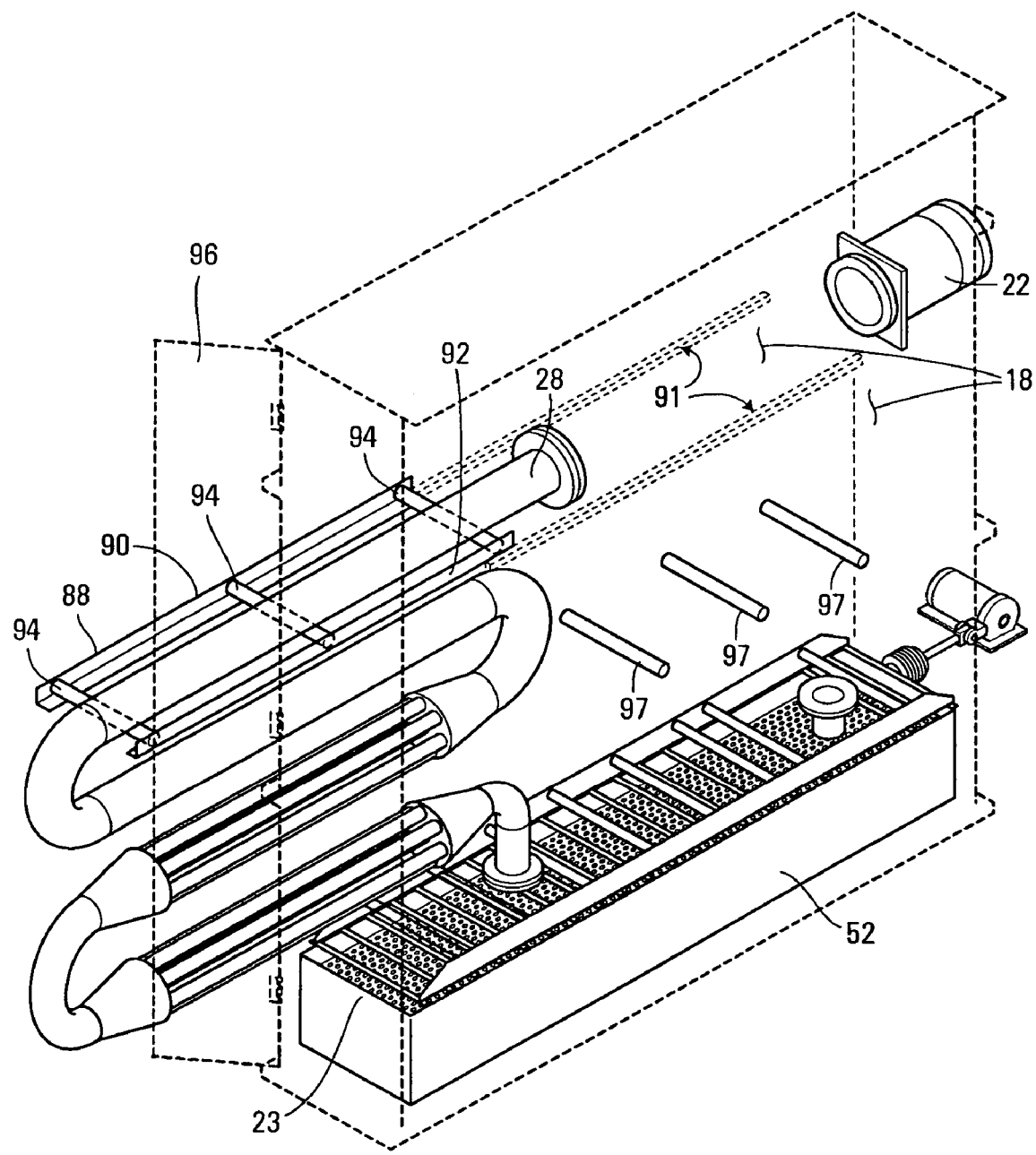
FIG. 4 is the apparatus of FIG. 1 with the burner conduit in an uninstalled position.

Referring now to FIG. 4, a conduit support 88 is slidingly connected to the housing 12 for supporting the burner conduit 28 during installation. The support 88 is operable for sliding between an outer position at least partially external to the housing 12 (shown in FIG. 4) and the installed position inside the housing 12. The conduit support 88 holds the conduit during installation and removal from the housing 12. The support 88 includes a pair of side rails 90, 92 slidingly connected to slide elements 91 formed on parallel walls 18 of the housing 12. A plurality of cross-bars 94 extend between the side rails 90, 92 to provide support surfaces for the burner conduit 28 to rest thereon. The housing 12 includes a side panel 96 operable to open when installing the burner conduit 28. A plurality of ties 97 structurally connects the side walls 18 of the housing 12 to one another to prevent outward bowing of the walls 18 when the housing 12 is filled with gypsum. The ties 97 can be welded or otherwise affixed by any means that is conventional.

Figure 5:
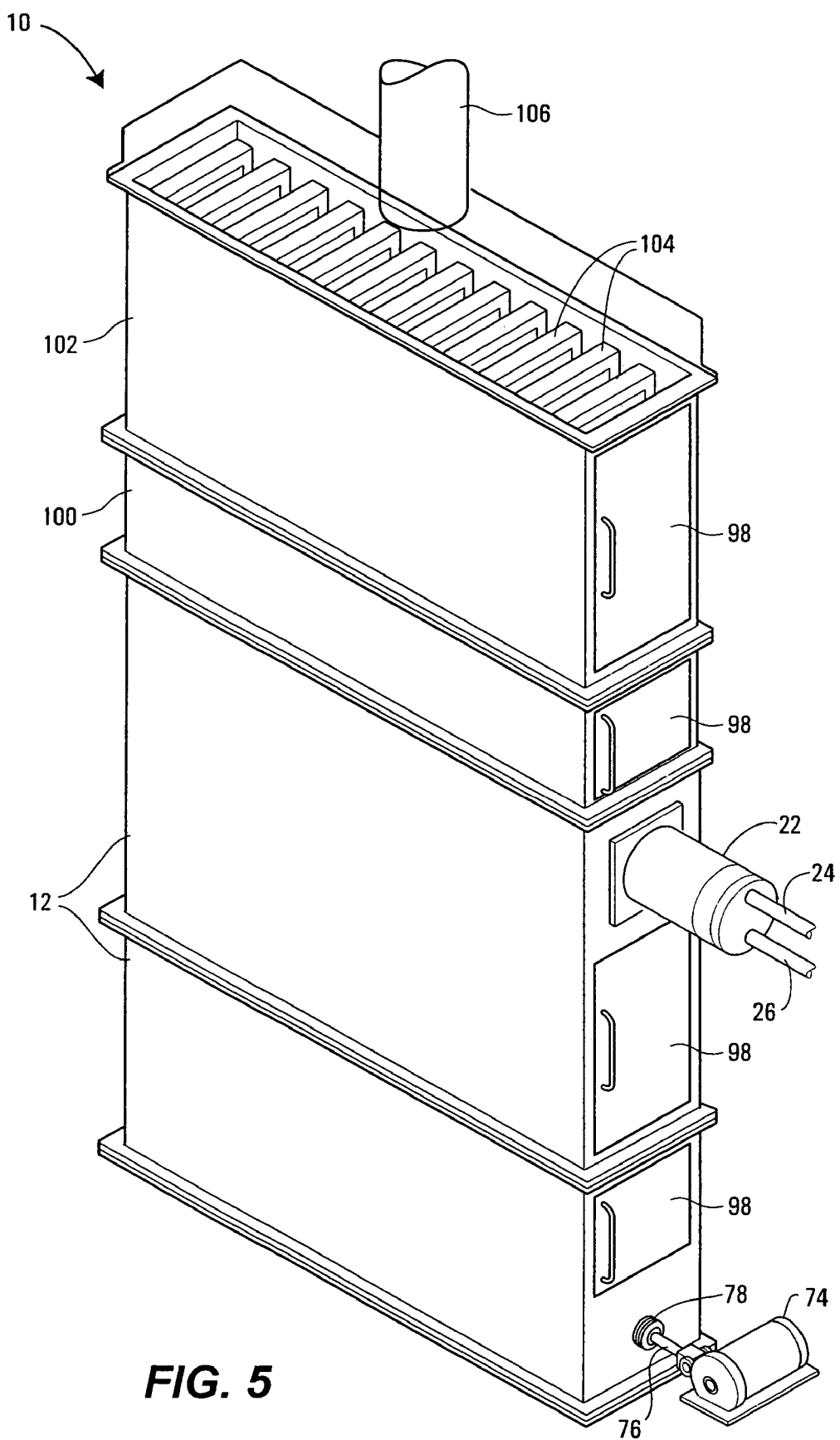
FIG. 5 is the apparatus of FIG. 1 showing a plurality of access panels attached thereto.
Figure 6:
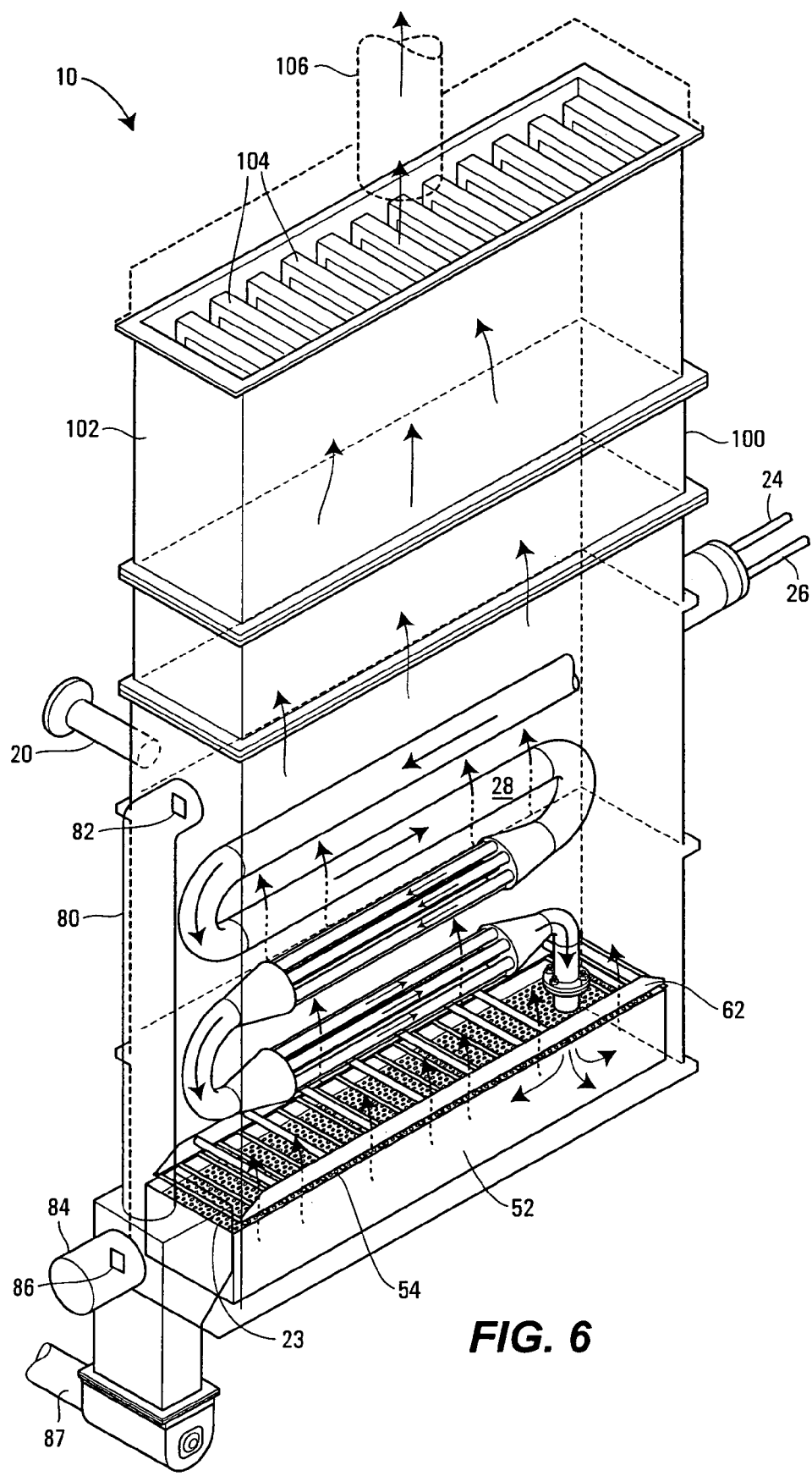
FIG. 6 is a perspective view of the calcining apparatus of FIG. 1 showing the exhaust flow path with arrows.

Referring now to FIG. 5, the apparatus 10 includes access panels 98 located on the side of the housing 12 for permitting servicing of the internal components, such as the burner 22 and the conduit 28, etc. A disengagement chamber 100 is positioned above the open top 16 of the housing 12 and is constructed to permit access thereto for servicing internal components of the housing 12. A dust collector 102 can be positioned above the disengagement chamber 100 to collect gypsum dust particles and recycle the particles back into the housing 12 for calcining. The dust collector 102 can include a plurality of replaceable filters 104. The filters 104 can be of any desired type such as round cartridge filters, bag filters, or the like. The filters 104 can be periodically cleaned by intermittently injecting air through an opposite side of where the dust is collected or by shaking as is known to those skilled in the art. An exhaust stack 106 permits the exhaust to be removed from the apparatus 10 after the gypsum dust particles have been removed by the filters 104.

In operation, gypsum powder is fed into an inlet fixture 20 to fill the housing 12. Air and fuel are supplied by the conduits 24, 26 respectively, to the burner 22. The burner 22 combusts the air-fuel mixture and provides hot exhaust gases which flow in the direction of the arrows shown in FIG. 6. The exhaust flows through the serpentine burner conduit 28 into the fluidization base 52. From the fluidization base 52, the exhaust flows horizontally and then upwardly through the fluidization pad 54 positioned above the base 52. The fluidization pad 54 distributes the exhaust gases through the gypsum product so that the heated exhaust gases are evenly distributed therethrough. The outer surface of the burner conduit 28 provides heat to the gypsum through conduction heat transfer. Thus, the gypsum product is heated both when the exhaust gas flows through the burner conduit 28 and through the gypsum after traveling through the fluidization pad 54. The present invention provides for increased fuel efficiency over the prior art because the dual heating method removes the maximum amount of heat from the exhaust and transfers it into the gypsum. Exhaust gas continues to flow upwardly through the disengagement chamber 100 permitting some of the gypsum particles to separate from the exhaust flow and fall back into the housing 12. The dust collector 102 cleans the airborne gypsum particles from the exhaust gas before exhaust gas egresses through the exhaust stack 106. The gypsum particles can periodically be knocked from the collector filter cartridges (or bags) back into the bed of gypsum.

Advantageously, an agitation mechanism 62 is provided to ensure good fluidization by preventing exhaust from channeling directly through gypsum powder. Natural gypsum typically includes a fine powder that may be too cohesive to achieve good fluidization without agitation. The agitation mechanism 62 is operated by swinging between first and second positions to locally mix the gypsum and scrape it away from the fluidized pad 54. The calcining apparatus 10 has a high efficiency because substantially all of the heat produced by the burner 22 is utilized in heating the gypsum and is not lost through the exhaust process. The temperature of the exhaust gas leaving the gypsum product is approximately 300° F., which is the approximate temperature required for the gypsum to be processed into stucco. Synthetic gypsum that is manufactured with a standard particle size may not require agitation to ensure good fluidization.

While the preceding text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

What is claimed is:

1. An apparatus for calcining gypsum comprising:
   a housing having an open top, a bottom wall, and a plurality of side walls extending therebetween;
   a fixture located on the housing for receiving raw gypsum from a source and transferring the gypsum into the housing;
   a support floor positioned proximate the bottom wall for holding the gypsum in the housing;
   at least one burner connected to the housing and operable for combusting an air/fuel mixture to heat the gypsum; and
   at least one serpentine burner conduit extending through the housing from the at least one burner and terminating through the support floor.

2. The apparatus of claim 1, wherein the burner conduit includes an initial linear section extending from the burner.

3. The apparatus of claim 1, wherein the burner conduit includes at least one reduced diameter section to provide increased flow velocity and enhanced heat transfer effectiveness.

4. The apparatus of claim 1, wherein the burner conduit further comprises:
   a plurality of relatively smaller diameter conduits forming at least one multi conduit portion of the burner conduit, the at least one multi conduit portion constructed to be in fluid communication with the relatively larger diameter conduit.

5. The apparatus of claim 1, wherein the support floor comprises:
a fluidization base for receiving the exhaust flow from the burner conduit.

6. The apparatus of claim 5, further comprising:
a fluidization pad positioned above the fluidization base, the fluidization pad at least partially forming the support floor for holding the gypsum and being operable for controlling and distributing the exhaust flow from the fluidization base into the gypsum.

7. The apparatus of claim 6, wherein the fluidization pad comprises:
first and second outer perforated plates; and
at least one intermediate layer of material positioned between the outer plates.

8. The apparatus of claim 7, wherein the intermediate layer of material is a porous media made from one of a compressed silica fiber and a woven stainless steel mesh.

9. The apparatus of claim 7, wherein the perforated plates are made from metal.

10. The apparatus of claim 6, wherein the fluidization pad comprises:
a porous media material.

11. The apparatus of claim 10, wherein the porous media is made from one of a compressed silica fiber and a woven stainless steel mesh.

12. The apparatus of claim 1, further comprising:
an agitation mechanism operable for preventing fluid channeling and preventing dead pockets of gypsum from forming adjacent the support floor.

13. The apparatus of claim 12, wherein the agitation mechanism includes an agitator frame.

14. The apparatus of claim 13, wherein the agitation mechanism includes a plurality of agitation members connected to the agitator frame for agitating the gypsum adjacent the support floor when the agitator frame moves.

15. The apparatus of claim 13, wherein the agitation mechanism includes at least one pivotable support arm for pivotally connecting the agitator frame to the apparatus.

16. The apparatus of claim 15, wherein the at least one pivotable support arm is a cable pivotally attached to the calcining apparatus at one end and to the agitator frame at the other end, wherein the agitator frame will swing about a pivot axis when motion is imparted thereto.

17. The apparatus of claim 13, wherein the agitation mechanism includes a power source to move the agitator frame.

18. The apparatus of claim 17, wherein the power source includes one of an electric motor and a pneumatic actuator.

19. The apparatus of claim 18, further comprising:
an actuator arm extending through the housing to provide a connection between the motor and the agitator frame.

20. The apparatus of claim 19, wherein the agitation mechanism further comprises:
an expandable seal engaged with the actuator arm and the housing to prevent gypsum from leaking from the housing.

21. The apparatus of claim 20, wherein the seal expands and contracts as the actuator arm moves between first and second positions.

22. The apparatus of claim 13, wherein the agitator frame moves in one of: a horizontal, a vertical, and an arcuate pattern.

23. The apparatus of claim 1, further comprising:
an overflow tube in fluid communication with the apparatus to allow processed gypsum to egress out of the apparatus.

24. The apparatus of claim 23, further comprising:
an overflow valve associated with overflow tube to prevent gypsum from egressing from the apparatus before being heated to a predetermined condition.

25. The apparatus of claim 1, further comprising:
a dump port having a dump valve for permitting selective draining of the housing.

26. The apparatus of claim 1, further comprising:
an exhaust stack connected to the apparatus for exhausting combustion gas from the apparatus.

27. The apparatus of claim 1, further comprising:
a conduit support slideably connected to the apparatus for supporting the burner conduit during installed and uninstalled positions, the conduit support movable between a first position internal to the housing and a second position at least partially external to the housing for supporting the conduit during installation and removal from the housing.

28. The apparatus of claim 27, wherein the conduit support comprises:
a pair of beams slideably connected to parallel walls of the apparatus; and
a plurality of cross bars extending between the beams being engageable with the burner conduit.

29. The apparatus of claim 1, further comprising:
at least one access panel located on the housing for servicing internal components thereof.

30. The apparatus of claim 1, further comprising:
a disengagement chamber positioned adjacent the open top of the housing, the disengagement chamber having at least one door to permit access therein.

31. The apparatus of claim 1, further comprising:
a dust collector for collecting gypsum dust particles and recycling the particles back to the housing.

32. The apparatus of claim 31, wherein the dust collector includes a plurality of filters.

33. The apparatus of claim 32, wherein the filters are cleaned by intermittently injecting air through an opposing side of where the dust is collected.

34. The apparatus of claim 1, wherein the burner conduit includes a section having at least one through aperture to permit exhaust flow to exit therefrom directly into the gypsum.

35. An apparatus for calcining gypsum comprising:
a housing having an open top, a bottom wall, and a plurality of side walls extending therebetween;
a fixture connected to the housing for receiving raw gypsum from a source and transferring the gypsum into the apparatus;
at least one burner connected to a side wall and operable for combusting an air/fuel mixture to heat the gypsum;
at least one burner conduit extending from the at least one burner, the conduit passing in heat exchange relationship with the gypsum and discharging exhaust flow into the gypsum causing fluidization thereof; and
an agitation mechanism operable for preventing fluid channeling and dead pockets of gypsum adjacent the bottom wall.

36. The apparatus of claim 35, wherein the burner conduit includes a substantially straight section extending from the burner.

37. The apparatus of claim 35, wherein the burner conduit includes at least one reduced diameter section to provide increased flow velocity and enhanced heat transfer effectiveness.

38. The apparatus of claim 35, wherein the burner conduit further comprises:
a plurality of relatively smaller diameter conduits forming at least one multi conduit portion of the burner conduit, the at least one multi conduit portion constructed to be in fluid communication with the relatively larger diameter conduit.

39. The apparatus of claim 35, further comprising:
a fluidization base for receiving the exhaust flow from the burner conduit.

40. The apparatus of claim 39, further comprising:
a fluidization pad positioned above the fluidization base, the fluidization pad forming a floor for holding the gypsum and is operable for controlling and distributing the exhaust flow into the gypsum.

41. The apparatus of claim 40, wherein the fluidization pad comprises:
first and second outer perforated plates; and
at least one intermediate layer of material positioned between the outer plates.

42. The apparatus of claim 41, wherein the intermediate layer of material is a porous media made from compressed silica fiber.

43. The apparatus of claim 41, wherein the perforated plates are made from metal.

44. The apparatus of claim 35, wherein the agitation mechanism includes an agitator frame.

45. The apparatus of claim 44, wherein the agitation mechanism includes a plurality of agitation members connected to the agitator frame for agitating the gypsum adjacent the bottom wall when the agitator frame moves.

46. The apparatus of claim 44, wherein the agitation mechanism includes at least one pivotable support arm for pivotally connecting the agitator frame to the apparatus.

47. The apparatus of claim 46, wherein the at least one pivotable support arm is a cable pivotally attached to the calcining apparatus at one end and to the agitator frame at the other end, wherein the frame will swing about a pivot axis when motion is imparted thereto.

48. The apparatus of claim 35, wherein the agitation mechanism includes a power source to move the agitator frame.

49. The apparatus of claim 48, wherein the power source includes one of an electric motor and a pneumatic actuator.

50. The apparatus of claim 48, further comprising:
an actuator arm extending through the housing to provide a connection between the power source and the agitator frame.

51. The apparatus of claim 50, wherein the agitation mechanism further comprises:
an expandable seal engaged with the actuator arm and the housing to prevent gypsum from leaking from the housing.

52. The apparatus of claim 51, wherein the seal expands and contracts as the actuator arm moves between first and second positions.

53. The apparatus of claim 35, further comprising:
an overflow tube in fluid communication with the apparatus to allow processed gypsum to egress out of the apparatus.

54. The apparatus of claim 53, further comprising:
an overflow valve associated with overflow tube to prevent gypsum from egressing from the apparatus before being heated to a predetermined condition.

55. The apparatus of claim 35, further comprising:
a dump port having a dump valve for permitting selective draining of the housing.

56. The apparatus of claim 35, further comprising:
an exhaust stack connected to the apparatus for exhausting combustion gas from the apparatus.

57. The apparatus of claim 35, further comprising:
a conduit support having a pair of side rails slideably connected to parallel walls of the apparatus; and
a plurality of cross bars extending between the side rails engageable with the burner conduit for supporting the burner conduit during installed and uninstalled positions, the support movable between a first position internal to the housing and a second position at least partially external to the housing for supporting the conduit during installation and removal from the housing.

58. The apparatus of claim 35, further comprising:
at least one access panel located on the housing for servicing internal components thereof.

59. The apparatus of claim 35, further comprising:
a disengagement chamber positioned adjacent the open top of the housing, the disengagement chamber having at least one door to permit access therein.

60. The apparatus of claim 35, further comprising:
a dust collector for collecting gypsum dust particles and recycling the particles back to the apparatus.

61. The apparatus of claim 60, wherein the dust collector includes a plurality of filters.

62. The apparatus of claim 61, wherein the filters are cleaned by intermittently injecting air through an opposing side of where the dust is collected.

63. The apparatus of claim 35, wherein the burner conduit includes a section having at least one through aperture to permit exhaust flow to exit therefrom directly into the gypsum.

64. The apparatus of claim 35, wherein the burner conduit is formed in a generally serpentine shape.

65. The apparatus of claim 35, wherein the housing includes a generally rectangular cross-section.

66. The apparatus of claim 65, wherein a length of the cross-section is approximately sixteen feet.

67. The apparatus of claim 35, wherein the burner conduit includes a plurality of conduits positioned adjacent one another, the number of conduits being proportional to a width of the housing.

68. A method for calcining gypsum comprising the steps of:
providing gypsum to a calcining apparatus;
heating the gypsum with a serpentine burner via conduction heat transfer with a conduit extending from an external burner though the gypsum and terminating at a bottom wall of the apparatus;
flowing the exhaust gas through a fluidization pad; and
fluidizing and further heating the gypsum via convection heat transfer by flowing substantially all of the exhaust gas through the gypsum.

69. The method of claim 68, further comprising:
opening an overflow valve to permit the fluidized gypsum to egress therethrough when the gypsum reaches approximately 300 degrees Fahrenheit.

* * * * *

UNITED STATES PATENT AND TRADEMARK OFFICE
CERTIFICATE OF CORRECTION

| | |
|---|---|
| PATENT NO. | : 7,175,426 B2 |
| APPLICATION NO. | : 10/788871 |
| DATED | : February 13, 2007 |
| INVENTOR(S) | : Michael L. Bolind et al. |

It is certified that error appears in the above-identified patent and that said Letters Patent is hereby corrected as shown below:

In the Claims:

At Column 10, line 66, please add -- 70. The method of claim 68, further comprising: removing and churning stagnant portions of gypsum adjacent the bottom wall with an agitation mechanism. --.

Signed and Sealed this

Twenty-seventh Day of May, 2008

JON W. DUDAS
*Director of the United States Patent and Trademark Office*